Oct. 26, 1971     D. EPPLER     3,614,885

EXTRUSION TOOL

Filed April 9, 1970     2 Sheets-Sheet 1

INVENTOR.
DANIEL EPPLER

BY

ATTORNEY

INVENTOR.
DANIEL EPPLER
BY
ATTORNEY

United States Patent Office 3,614,885
Patented Oct. 26, 1971

3,614,885
EXTRUSION TOOL
Daniel Eppler, Toms River, N.J., assignor to
Thomas & Betts Corporation, Elizabeth, N.J.
Filed Apr. 9, 1970, Ser. No. 27,073
Int. Cl. B21c 27/02
U.S. Cl. 72—259                                30 Claims

ABSTRACT OF THE DISCLOSURE

The invention is directed to an improved extrusion tool. Slidably disposed within an open-ended selectively bored restrictively orificed elongated housing is an outer hollow plunger and at least one inner plunger in aligned telescoping cooperation with and resiliently coupled to the outer plunger, to permit the successive selective deformation of an article disposed within the housing. Mounted adjacent the open front end of the housing may be adjusting means for selectively restricting the orificial dimension thereof. The front end of the inner plunger may be appropriately contoured to form a complementary impression on an article intimately engaged therewith.

CROSS REFERENCE TO RELATED APPLICATIONS

This application relates to an improvement of a device disclosed in my copending application, Ser. No. 867,652, filed Oct. 20, 1969, by Daniel Eppler, for an "Extrusion Tool," assigned to the assignee of the instant invention.

BACKGROUND OF THE INVENTION

Field of the invention

The invention is directed to the field of extrusion tools applicable for use in deforming a first object about a second object. It is equally applicable to successive selective extruding means for deformable articles.

Description of the prior art

Extrusion tools according to the prior art as exemplified in my copending application Ser. No. 867,652, filed Oct. 20, 1969, for an "Extrusion Tool," assigned to the assignee of the instant invention, employed an open-ended bored housing and a single plunger slidably disposed therewithin, the plunger being movable towards and away from the restrictively orificed front end of the housing. A deformable article such as a connector placed within the bored passage of the housing forward of the plunger may be extruded through the restrictive orifice by actuating the plunger in a forward direction towards said article, forcibly urging the article towards and through the restrictive orifice. Thus, a further article such as a conductor placed within the deformable connector may be secured therein, upon the extrusion of the deformable connector thereabout. Because of the force required to properly extrude the connector through the restrictive orifice, certain limitations are imposed upon the type and configuration of connector which may be utilized in conjunction with this prior art device. As may be readily apparent from the above description, the entire front end of the inner plunger is caused to bear on the intimately adjacent end of the deformable connector to forcibly urge said connector forward. The results of any attempt to extrude a closed-end connector about a conductor to produce a closed, insulated connection thereabout were found to be generally unacceptable, since the deformable material comprising the closed end of the connector adjacent the front end of the plunger would be extruded radially outwardly, away from the center of the connector, under the compressive force of the plunger, often exposing the conductor end adjacent thereto and thereby partially defeating the highly desirable closed-end feature of the connector.

SUMMARY OF THE INVENTION

The invention is directed to an improved extrusion tool which overcomes the problems noted above with respect to the cited prior art device by providing means for extruding a partially apertured article about a further article inserted therein. Slidably mounted within a longitudinally-bored elongated housing, and intermediate the ends thereof, is a generally hollow outer plunger within which is disposed, in cooperable telescoping relationship, an inner plunger, the forward end of which is movable extensibly beyond and retractably rearward of the forward end of the outer plunger. Adjacent the open front end of the housing and extending radially inwardly from the inner longitudinal passage-defining surface therethrough is a protruding portion serving as an orificial restriction thereof. In operation, a deformable article, appropriately introduced within the bored housing forward of, and adjacent to, the front ends of both the inner and outer plungers, is forcibly advanced towards and through the restricted housing orifice, said article being successively selectively deformed thereby, the generally central rearward portion of said article being restrictively confined within the chamber-like cavity defined by the predetermined initial displacement between the forward ends of the inner and outer plungers. Protrusion adjusting means may be provided adjacent the front end of the housing to vary the orificial dimension thereof. It is therefore an object of this invention to provide an improved extrusion tool.

It is another object of this invention to provide an improved extrusion tool for successively selectively deforming an article disposed therewithin.

It is a further object of this invention to provide an improved extrusion tool for successively selectively deforming an article about a further article inserted within said first article.

It is yet another object of this invention to provide an improved extrusion tool for successively selectively deforming a closed-end connector about a conductor disposed therewithin.

It is still a further object of this invention to provide an improved extrusion tool having an inner plunger disposed in cooperable telescoping relation within a hollow outer plunger.

It is still another object of this invention to provide an improved extrusion tool having an inner plunger disposed in cooperable telescoping relation within a hollow outer plunger for successively selectively deforming an article about a further article inserted within said first article.

It is yet a further object of this invention to provide an improved extrusion tool having a selectively variable orifice.

It is still a further object of this invention to provide an improved extrusion tool having a selectively variable orifice and an inner plunger disposed in cooperable telescoping relation within a hollow outer plunger for successively selectively deforming an article disposed therewithin.

Other objects and features of the invention will be pointed out in the following description and claims and illustrated in the accompanying drawings, which disclose, by way of example, the principle of the invention and the best modes which have been contemplated for carrying it out.

BRIEF DESCRIPTION OF THE DRAWINGS

In the drawings.

Similar elements are given similar reference characters in each of the respective drawings.

DESCRIPTION OF THE PREFERRED EMBODIMENTS

Figure 1:
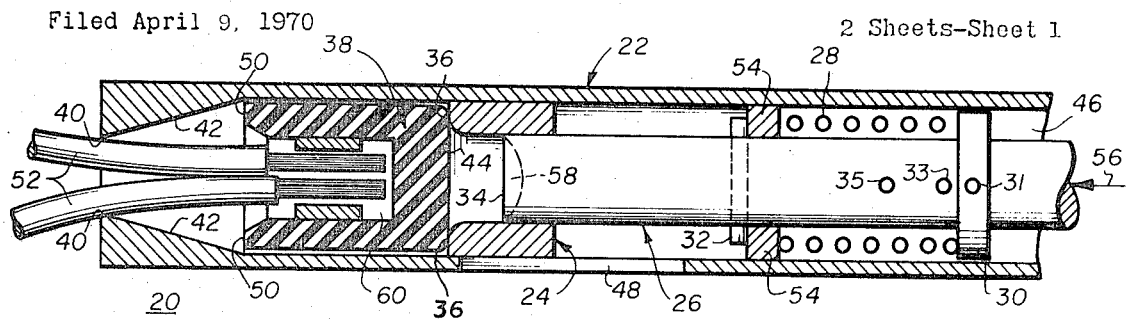
FIG. 1 is a side elevation view, partly in section, of a portion of an improved extrusion tool constructed in accordance with the concepts of the invention, including a connector with conductors therein, prior to deformation of the connector.
Figure 2:
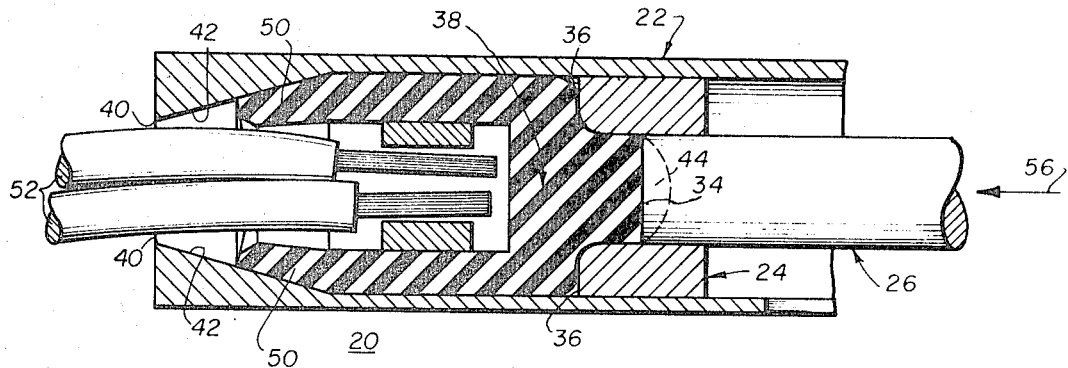
FIG. 2 is a side elevation view, partly in section, of the improved extrusion tool of FIG. 1, illustrating the connector disposed therewithin in a partly advanced state of deformation.
Figure 3:
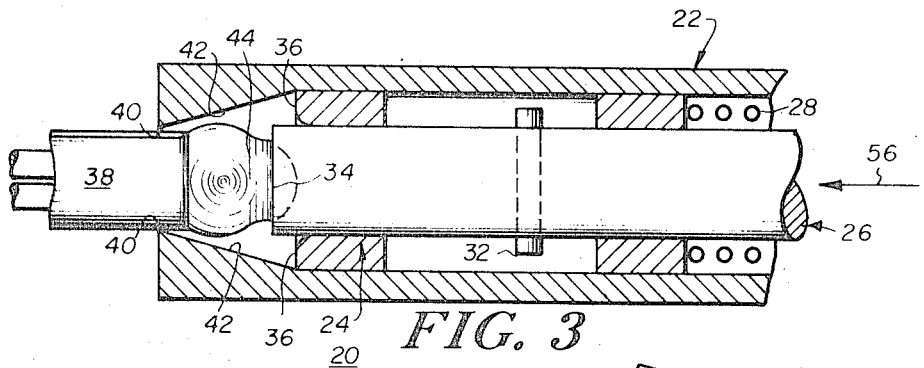
FIG. 3 is a side elevation view, partly in section, of the improved extrusion tool of FIG. 1, in a further advanced state of operation.

Referring now to FIGS. 1, 2 and 3, there is shown a portion 20 of an improved extrusion tool constructed in accordance with the concepts of the invention. The remaining portion of the structure and the means for operating same are fully illustrated and disclosed in my copending application to which reference is made. A housing 22, having a longitudinal passage 46 therethrough, has axially positioned therein, intermediate the ends thereof, and in slidable relation therewith, an outer generally hollow plunger 24. An inner plunger 26 is positioned within, and is in cooperable telescoping relationship with, outer plunger 24. Circumjacent a portion of inner plunger 26, generally remote from the first end 36 thereof, is a resilient coupling means such as spring member 28. Adjustably coupled to inner plunger 26 adjacent spring member 28 and in cooperable relation with one end thereof, is a resilient coupling adjusting means such as collar 30, said collar 30 being selectively movable adjacent apertures 33 and 35 of inner plunger 26 by the removale of a coupling means such as pin 31 from collar 30 and the reinsertion therein and through apertures 33 and 35, as desired. The other end of spring member 28 is in cooperative compressive contact with the end 54 of outer plunger 24 immediately adjacent thereof. Protruding outwardly from the outer surface of inner plunger 26 generally intermediate the ends thereof is a stop means such as pin 32 adapted to restrict the rearward displacement of inner plunger 26 by engagement with the adjacent end 54 of outer plunger 24. Adjacent the front end 40 of housing 22 and extending laterally inwardly generally normal to the longitudinal axis of housing 22 is a protruding portion 42 appropriately contoured to provide an orificial restriction in the area substantially adjacent front end 40. As illustrated in FIGS. 1, 2 and 3, the inner surface of protruding portion 42 is inclined in generally oblique angular relation to the longitudinal axis of housing 22, sloping axially progressively inwardly towards front end 40. Longitudinally disposed generally inwardly of the first end 34 of inner plunger 26 is a depressed portion, such as 58. It should be understood that although a generally concave surface 58 is shown, various other appropriately contoured shapes, some of which will be described below, may be utilized without departing from the spirit of the invention. By way of example, and to more fully illustrate the mode of operation of improved extrusion tool 20, with particular reference to FIG. 1, inner and outer plungers 24 and 26 are sufficiently retracted rearward of aperture 48 in a direction opposite to that indicated by arrow 56 to fully expose aperture 48, permitting the insertion therethrough of a deformable article such as apertured connector 38. Thereafter, said inner and outer plungers are repositioned in a direction towards front end 40 of housing 22, substantially as shown, apertured connector 38 assuming a position within the longitudinal passage 46 thereof directly adjacent the front ends 34 and 36 of inner and outer plungers 24 and 26, respectively. Prior to the extruding operation, the depressed front end 34 of inner plunger 26 is longitudinally displaced slightly rearward of the front end 36 of outer plunger 24, forming a chamber-like orifice, substantially as shown, adjacent closed end 44 of connector 38. The bared ends of insulated conductors such as 52 may then be inserted within aperture 60 of connector 38 for subsequent retention therein. The forward end 50 of connector 38 is at least partially restrained within the longitudinal passage 46 immediately adjacent protruding portion 42 of housing 22. By means of handle 44 as set forth in FIG. 4 of the referenced copending application an external force may then be applied to inner plunger 26, directionally as indicated by arrow 56. Inner and outer plungers, 26 and 24, respectively, are thereby caused to be simultaneously advanced towards the front end 40 of housing 22, spring member 28 compressively urging outer plunger 24 forward in cooperaable relation with inner plunger 26. As may be more clearly seen in FIG. 2, inner plunger 26 and outer plunger 24 have been advanced forwardly of their position as shown in FIG. 1, urging connector 38 along the sloping inner surface of protruding portion 42 towards front end 40 of housing 22, protruding portion 42 thereof laterally deforming the forward end 50 of connector 38 inwardly and against the insulated portions of conductors 52, and at least partially impeding the forward movement of connector 38 in the direction of arrow 56. As a result, outer plunger 24 is required to exert an increasingly greater force against the adjacent deformable portion 44 of connector 38 to effect the required forward displacement thereof. The deformable portion 44 of connector 38 immediately adjacent the forward end 36 of outer plunger 24 is thereby partially extruded inwardly therefrom, occupying and substantially filling the chamber-like orifice adjacent the forward end 34 of inner plunger 26. The deformable portion 44 of connector 38 thus extruded is at least partially compressed by said operation, forming a desirably more rigid portion directly adjacent the forward end 34 of inner plunger 26. As connector 38 is further advanced towards and through the orificially restricted front end 40 of housing 22, it is caused to be progressively deformed inwardly and rearwardly, in a direction opposite to arrow 56, the resilient outer insulating portion thereof being partially compacted and extrudably displaced towards the closed end 44 thereof. Inner and outer plungers 26 and 24, respectively, are shown in a yet further advanced position in FIG. 3. As illustrated therein, the forward end 36 of outer plunger 24 is in intimate engagement with the inwardly protruding portion 42 of housing 22, being restrictively impeded thereby from further advancement. Inner plunger 26 is shown as being forwardly displaced from its original position relative to outer plunger 24 as a result of the compression of resilient coupling means 28, wherein the forward end 34 of inner plunger 26 is permitted to telescopingly slidably advance forward of the front end 36 of outer plunger 24 generally as illustrated, utilizing the increasingly compacted closed-end portion 44 of connector 38 as a pressure means to successively selectively advance connector 38 through front end 40 of housing 22.

Figure 4:
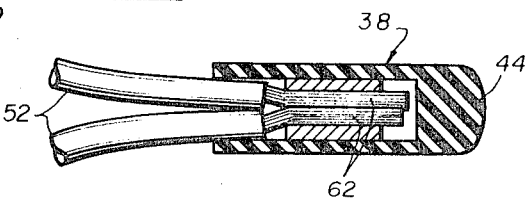
FIG. 4 is a side elevation view, in section, of a connector deformed about two conductors.

FIG. 4 is an illustrative example of a completed closed-end connector 38, in section, as deformably extruded through an improved extrusion tool such as 20. Insulated conductors 52 are shown rigidly encased within connector 38, the bared ends 62 thereof being protectively shielded from the external environment by the closed end 44.

Figure 5:
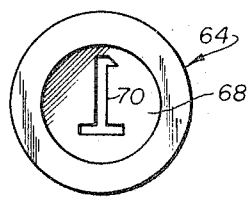
FIG. 5 is an illustrative view of a first embodiment of the front end of the inner plunger of the tool of FIG. 1 constructed in accordance with the concepts of the invention.
Figure 7:
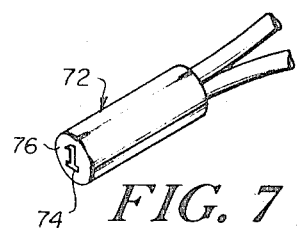
FIG. 7 is a perspective view of an extruded connector after deformation, illustrating thereon a symbolic impression formed by the inner plunger of FIG. 5.

Turning now to FIG. 5, there is shown a further embodiment of the depressed front end 68 of an inner plunger 64 of an improved extrusion tool constructed in accordance with the concepts of the invention. Protruding from the depressed surface 68 of inner plunger 64 is a raised portion such as the symbolic representation 70 indicated thereon as a reversed FIG. 1. It should be understood that other indicia may be utilized without departing from the spirit of the invention. Illustrated in FIG. 7 is a representative closed-end connector 72 having impressed thereon adjacent the closed end 76 thereof a typical symbolic representation 74 such as would be formed by the raised portion 70 of inner plunger 64, upon the extrusion of said connector 72 from an improved extrusion tool such as 20.

Figure 6:
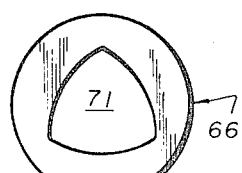
FIG. 6 is an illustrative view of another embodiment of the front end of the inner plunger of the tool of FIG. 1 constructed in accordance with the concepts of the invention.

Turning now to FIG. 6, there is shown another embodiment of the depressed front end 71 of an inner plunger 66 of an improved extrusion tool constructed in accordance with the concepts of the invention, wherein the inner walls of the depressed front end 71 define a generally triangular shaped cavity, as illustrated. It should be understood that although only one such shape is shown, other appropriate variations of contour may be provided without departing from the spirit of the invention.

Figure 8:
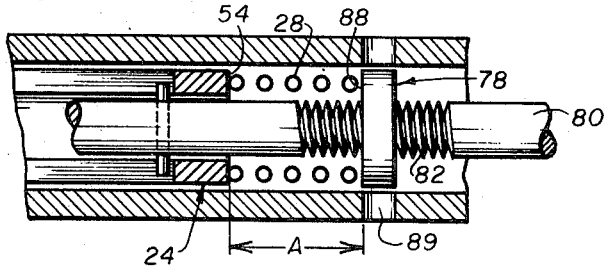
FIG. 8 is a side elevation view, partly in section, of a further embodiment of the plunger portion of an improved extrusion tool constructed in accordance with the concepts of the invention.

Referring now to FIG. 8, there is shown a further embodiment of a resilient coupling adjusting means 78 of an improved extrusion tool constructed in accordance with the concepts of the invention. Inner plunger 80 has disposed circumjacent a selective portion thereof an externally threaded portion such as 82. Threadably engaged thereon and movably coupled thereto, for longitudinal adjustment thereon, is a resilient coupling adjusting means such as internally threaded, preferably circular, member 78. As shown, a resilient coupling means such as spring member 28 is initially confined between the rearward end 54 of outer plunger 24 and an adjacent surface 88 of threaded member 78, the confined length of spring member 28 being indicated as A in FIG. 8. By the appropriate rotation of threaded member 78 in a clockwise or counterclockwise direction, length A, and consequently the spring pressure of spring member 28, may be varied within predetermined limits, affording a desirably convenient and simple adjustment of the resilient coupling between inner plunger 80 and outer plunger 24. The rotation of threaded member 78 may be accomplished by inserting an appropriately shaped tool through housing aperture 89 immediately adjacent threaded member 78 and positively engaging said member 78 preferably about a portion of its periphery, to urge threaded member 78 in either a clockwise or counterclockwise direction.

Figure 9:
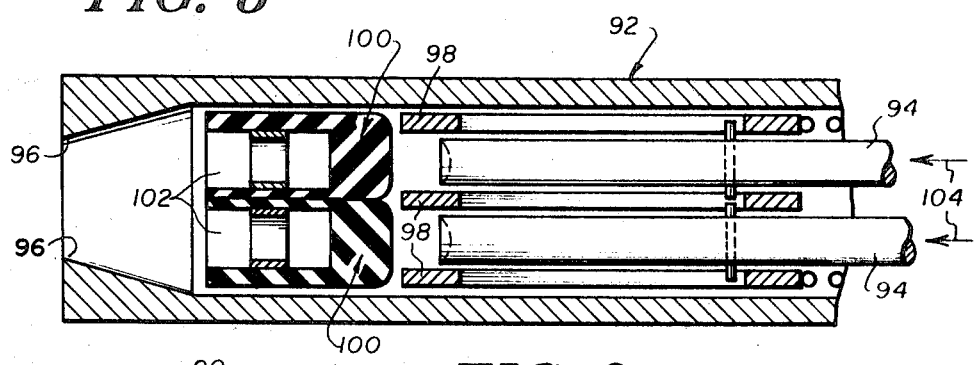
FIG. 9 is a side elevation view, partly in section, of a portion of an improved extrusion tool constructed in accordance with still another embodiment of the invention.
Figure 10:
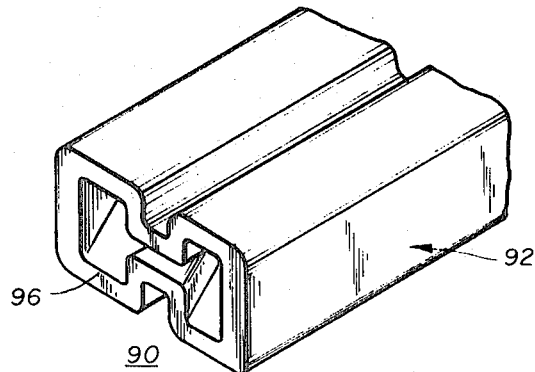
FIG. 10 is a perspective view of the front end of the improved extrusion tool of FIG. 9.

Turning now to FIGS. 9 and 10, there is shown a portion 90 of an improved extrusion tool constructed in accordance with a further embodiment of the invention. A pair of inner plungers 94 are positioned within and are in cooperable telescoping relationship with, a generally hollow outer plunger 98 appropriately contoured to maintain proper spaced-apart relationship between said inner plungers. The operation of said improved extrusion tool is generally similar to that described above with respect to the embodiment of FIGS. 1, 2 and 3, permitting, however, increased versatility thereover. As may be clearly seen in FIG. 9, a pair of closed-end deformable articles such as connectors 100 may be simultaneously selectively deformed upon the application of a forwardly directed force, as indicated by arrows 104. It should be appreciated that connectors 100 may be individually selectively deformed by merely advancing one of the said inner plungers 94 independently of the other. Further, it should be understood that a plurality of such inner plungers 94 may be provided for either simultaneous or independent deformation of articles such as connectors 100 without departing from the spirit of the invention. FIG. 10 more clearly illustrates, in a perspective representation, the front end 96 of housing 92, together with the portion immediately adjacent thereto. And, here again, it should be clearly understood that although a generally rectangular orifice is shown, other appropriate orificial configurations, readily apparent to those skilled in the art, may be provided without departing from the spirit of the invention.

Figure 11:
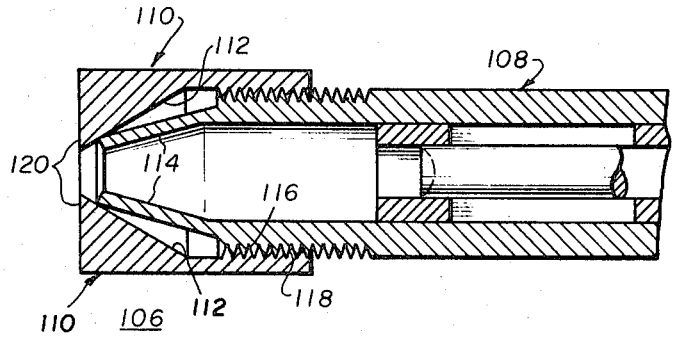
FIG. 11 is a side elevation view, partly in section, of the front end portion of an improved extrusion tool constructed in accordance with still a further embodiment of the invention.

Referring now to FIG. 11, there is shown a further embodiment of a portion 106 of an improved extrusion tool constructed in accordance with the concepts of the invention. Circumjacent the front end 114 of housing 108 and threadably coupled thereto is a protrusion adjusting means 110 having an obliquely angled inner surface 112 generally adjacent the first end 120 of adjusting means 110, and an internally threaded portion 118 generally adjacent the end of protrusion adjusting means 110 remote from said first end 120 and adapted to threadably engage a complementarily threaded portion 116 on housing 108. The inner obliquely-angled surface 112 of protrusion adjusting means 110 is in slidably intimate engagement with the immediately adjacent portion of front end 114 of housing 108, as adjusting means 110 is rotated. Upon the clockwise or counterclockwise rotation of protrusion adjusting means 110, said means 110 is caused to be axially displaced longitudinally of the housing 108, wherein deflectable front end 114 of housing 108 is laterally varied by the obliquely-angled inner surface 12 of protrusion adjusting means 110, thereby providing convenient means for selectively modifying the orificial dimensions of front end 114.

The embodiments of the invention in which an exclusive property or privilege is claimed are defined as follows:

1. An improved extrusion tool of the type comprising a housing having a longitudinal passage therethrough; at least one protrusion mounted adjacent and extending into a first end of said longitudinal passage partially blocking same; a transverse passage extending from the outside of said housing to and communicating with said longitudinal passage for placing articles within said longitudinal passage; an aperture in the end of said housing communicating with said longitudinal passage; and a slot extending from the outside of said housing to and communicating with both longitudinal and transverse passages, wherein the improvement comprises: an outer generally hollow plunger means having a first end and a second end, said outer plunger means being positioned within said longitudinal passage intermediate the ends thereof, and in slidable relation therewith, said first end of said outer plunger means generally adjacent said protrusion; at least one inner plunger means having a first end and a second end, said inner plunger means being at least partially positioned within said outer plunger means and in cooperable telescoping relationship therewith, said first end of said inner plunger means generally adjacent said protrusion; and resilient coupling means coupled to said inner plunger means and said outer plunger means for permitting selective cooperable movement therebetween; the movement of said inner and said outer plunger means towards said first end of said housing urging an article disposed within said longitudinal passage against said protrusion, causing the successive selective deformation of said article about a further article placed therewithin.

2. The improved structure of claim 1 wherein said resilient coupling means is a spring member.

3. The improved structure of claim 2 wherein said spring member is disposed generally circumjacent said inner plunger means.

4. The improved structure of claim 1 further comprising stop means disposed intermediate said inner and said outer plunger means to predeterminedly position said inner plunger means within said outer plunger means.

5. The improved structure of claim 4 wherein said stop means is a projecting portion coupled to and extending generally outwardly from the outer surface of said inner plunger means in cooperation with a mating adjacent portion of said outer plunger means.

6. The improved structure of claim 1 further comprising resilient coupling adjusting means adjustably coupled to said inner plunger means remote from said first end thereof, and generally adjacent said resilient coupling means, for varying the resilient coupling between said inner and said outer plunger means.

7. The improved structure of claim 6 wherein said resilient coupling adjusting means is a threaded member threadably engaging said inner plunger means.

8. The improved structure of claim 1 further comprising protrusion adjusting means generally circumjacent and in intimate engagement with said first end of said housing and movably coupled thereto, for selectively varying the orificial dimension thereof.

9. The improved structure of claim 8 wherein said protrusion adjusting means comprises a first inner surface substantially adjacent a first end thereof, and obliquely angled with respect to the longitudinal axis of said protrusion adjusting means, said inner surface adapted to engage said first end of said housing to effect selective lateral displacement thereof.

10. The improved structure of claim 9 wherein said protrusion adjusting means further comprises an internally threaded portion substantially adjacent the second end thereof, and said housing has an externally threaded portion substantially adjacent said first end thereof, for receiving said internally threaded portion of said protrusion adjusting means in threaded engagement.

11. The improved structure of claim 1 comprising two said inner plunger means.

12. The improved structure of claim 1 comprising a plurality of said inner plunger means.

13. The improved structure of claim 1 wherein said inner plunger means has an at least partially depressed portion longitudinally disposed generally inwardly of said first end thereof, said depressed portion at least partially engaging the adjacent end of an article disposed within said longitudinal passage.

14. The improved structure of claim 13 wherein said inner plunger means depressed portion is generally concave.

15. The improved structure of claim 13 wherein said inner plunger means depressed portion further comprises a raised portion thereon for forming a complementary impression in the adjacent end of an article placed in intimate engagement therewith.

16. The improved structure of claim 11 wherein at least one of said two inner plunger means has an at least partially depressed portion longitudinally disposed generally inwardly of said first end thereof, said depressed portion at least partially engaging the adjacent end of an article disposed within said longitudinal passage.

17. The improved structure of claim 16 wherein said inner plunger means depressed portion is generally concave.

18. The improved structure of claim 16 wherein said inner plunger means depressed portion further comprises a raised portion thereon for forming a complementary impression in the adjacent end of an article in intimate engagement therewith.

19. The improved structure of claim 12 wherein at least one of said plurality of inner plunger means has an at least partially depressed portion longitudinally disposed generally inwardly of said first end thereof, said depressed portion at least partially engaging the adjacent end of an article disposed within said longitudinal passage.

20. The improved structure of claim 19 wherein said inner plunger means depressed portion is generally concave.

21. The improved structure of claim 19 wherein said inner plunger means depressed portion further comprises a raised portion thereon for forming a complementary impression in the adjacent end of an article placed in intimate engagement therewith.

22. The improved structure of claim 11 wherein said resilient coupling means is a spring member.

23. The improved structure of claim 22 wherein said spring member is disposed generally circumjacent said two inner plunger means.

24. The improved structure of claim 12 wherein said resilient coupling means is a spring member.

25. The improved structure of claim 24 wherein said spring member is disposed generally circumjacent said plurality of inner plunger means.

26. The improved structure of claim 11 further comprising stop means disposed intermediate said two inner and said outer plunger means to predeterminedly position said two inner plunger means within said outer plunger means.

27. The improved structure of claim 12 further comprising stop means disposed intermediate said plurality of inner plunger means and said outer plunger means to predeterminedly position said plurality of inner plunger means within said outer plunger means.

28. The improved structure of claim 1 wherein said inner plunger means is a generally uniform diameter cylindrical member.

29. The improved structure of claim 11 wherein at least one of said two inner plunger means is a generally uniform diameter cylindrical member.

30. The improved structure of claim 12 wherein at least one of said plurality of inner plunger means is a generally uniform cylindrical member.

References Cited

UNITED STATES PATENTS

| 2,591,062 | 4/1952 | Gillett | 72—253 |
| 3,559,270 | 2/1971 | Beghi | 72—253 |

FOREIGN PATENTS

| 1,109,960 | 6/1961 | Germany | 72—391 |

LOWELL A. LARSON, Primary Examiner

U.S. Cl. X.R.

18—5 E; 29—282, 519; 72—261